(12) United States Patent
Suzuki

(10) Patent No.: US 12,177,399 B2
(45) Date of Patent: Dec. 24, 2024

(54) INFORMATION PROCESSING METHOD FOR USER TERMINAL OF IMAGE FORMING APPARATUS SYSTEM

(71) Applicant: Toshiba Tec Kabushiki Kaisha, Tokyo (JP)

(72) Inventor: Hideaki Suzuki, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/464,810

(22) Filed: Sep. 11, 2023

(65) Prior Publication Data

US 2024/0195925 A1  Jun. 13, 2024

(30) Foreign Application Priority Data

Dec. 8, 2022  (JP) ................................ 2022-196196

(51) Int. Cl.
*G06F 3/12* (2006.01)
*H04N 1/00* (2006.01)

(52) U.S. Cl.
CPC ..... *H04N 1/00915* (2013.01); *H04N 1/00639* (2013.01); *H04N 1/00822* (2013.01)

(58) Field of Classification Search
None
See application file for complete search history.

(56) References Cited

U.S. PATENT DOCUMENTS

| | | | | |
|---|---|---|---|---|
| 6,894,793 B1* | 5/2005 | Roosen | ................. | G06F 3/1259 358/1.14 |
| 8,363,257 B2 | 1/2013 | Higuchi | | |
| 2001/0052995 A1* | 12/2001 | Idehara | ................. | G06F 3/1285 358/1.15 |
| 2003/0090697 A1* | 5/2003 | Lester | ................... | G06F 3/1234 358/1.14 |
| 2013/0208312 A1* | 8/2013 | Morita | ................ | G06F 3/04883 358/1.15 |
| 2014/0240781 A1* | 8/2014 | Okigami | ............... | G06F 3/1238 358/1.15 |
| 2014/0355048 A1* | 12/2014 | Kang | ....................... | H04B 5/70 358/1.15 |
| 2015/0277810 A1* | 10/2015 | Fukasawa | ............. | G06F 3/1204 358/1.15 |
| 2019/0384537 A1 | 12/2019 | Arai | | |
| 2022/0232134 A1* | 7/2022 | Suga | .................. | H04N 1/00411 |

* cited by examiner

*Primary Examiner* — Dung D Tran
(74) *Attorney, Agent, or Firm* — Kim & Stewart LLP

(57) ABSTRACT

To reduce a burden on a user when selecting an image forming device from a user terminal, an information processing method includes acquiring use information from a local storage device of the user terminal. The use information is about past use of image forming devices in a plurality of image forming devices connectable to the user terminal. The method further includes transmitting a status request to the image forming devices used in the past, generating screen data for a history display screen based on the use information regarding the past use of the image forming devices, and causing a display device to display the history display screen with those image forming devices currently in a usable status based on a returned status request response being shown in one mode and those image forming devices currently in an unusable status based on a returned status request being shown in another mode.

20 Claims, 6 Drawing Sheets

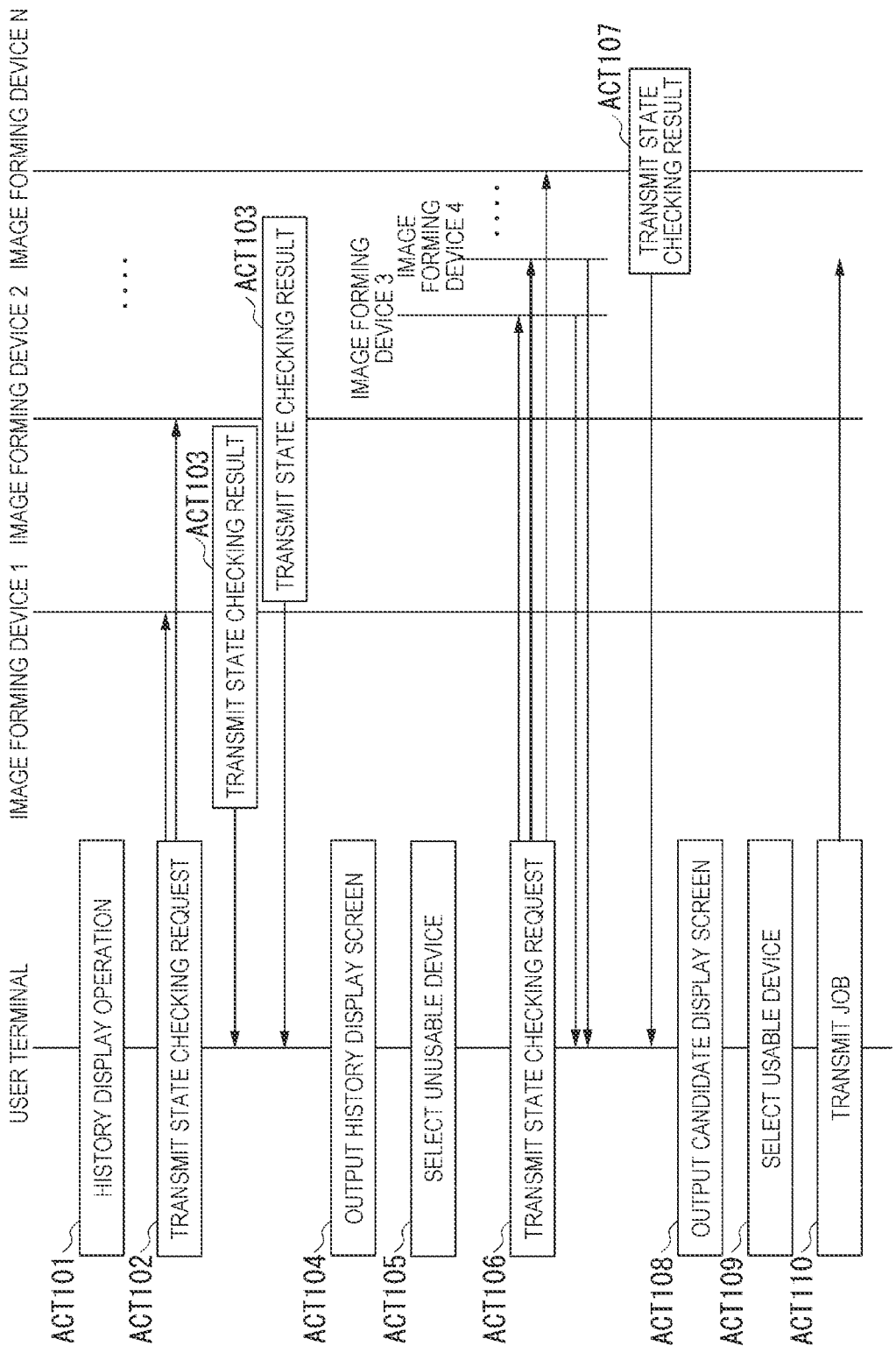

INFORMATION PROCESSING METHOD FOR USER TERMINAL OF IMAGE FORMING APPARATUS SYSTEM

CROSS-REFERENCE TO RELATED APPLICATION

This application is based upon and claims the benefit of priority from Japanese Patent Application No. 2022-196196, filed Dec. 8, 2022, the entire contents of which are incorporated herein by reference.

FIELD

Embodiments described herein relate generally to an information processing method.

BACKGROUND

In the related art, an image forming job is transmitted from a terminal device to an image forming device, such as a multifunction peripheral (MFP), via a network. In an environment in which a plurality of image forming devices can be used, not all the image forming devices might be displayed for selection, but an image forming device that has been used in the past may be preferentially displayed on the terminal device. With this configuration, it is not necessary to identify a desired image forming device from among all the image forming devices every time a user transmits an image forming job. Therefore, the work burden on the user is reduced. However, if the image forming device used in the past is presently in an unusable state, the user needs to select an alternative image forming device from among all the image forming devices again. Therefore, the work burden on the user may increase.

BRIEF DESCRIPTION OF THE DRAWINGS

FIG. 6 is a sequence chart of a processing flow of an image forming system.

DETAILED DESCRIPTION

In general, according to one embodiment, an information processing method capable of reducing the operation burden on a user when selecting a desired image forming device from a user terminal is provided.

An information processing method for a user terminal connectable to a plurality of image forming devices includes acquiring use information from a local storage device of a user terminal. The use information regards past use of image forming devices in a plurality of image forming devices. The method further includes transmitting a status request to the image forming devices in the plurality of image forming devices used in the past, generating screen data for a history display screen based on the use information regarding the past use of the image forming devices, and causing a display device to display the history display screen with those image forming devices currently in a usable status based on a returned status request response being shown in one mode and those image forming devices currently in an unusable status based on a returned status request being shown in another mode.

Figure 1:
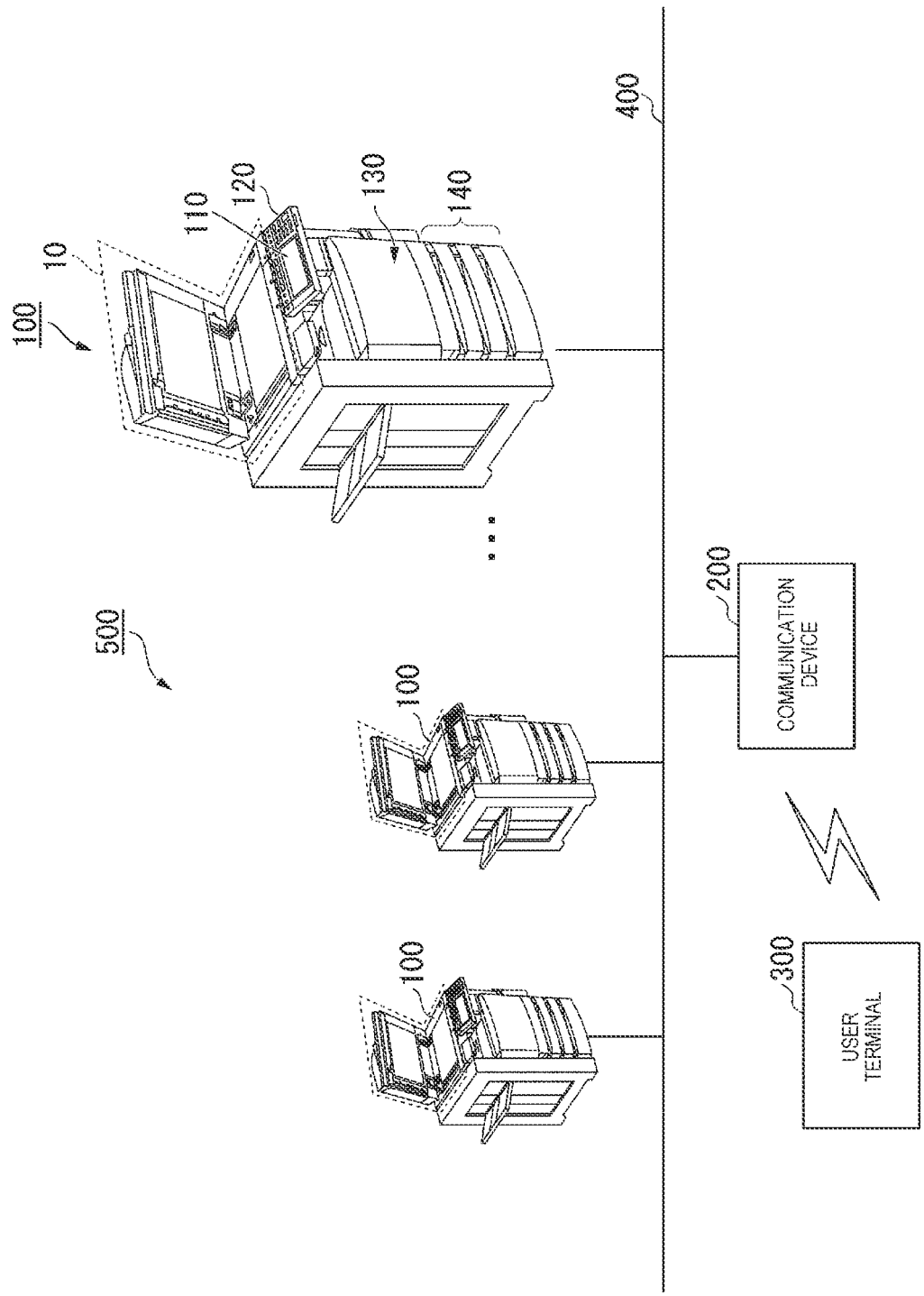
FIG. 1 is a diagram of an image forming system according to an embodiment.

Hereinafter, a computer program and an information processing method according to certain example embodiments will be described with reference to the drawings. FIG. 1 is a diagram showing a configuration example of an image forming system 500 according to the embodiment. The image forming system 500 includes a plurality of image forming devices 100, a communication device 200, a user terminal 300, and a network 400. Each image forming device 100 is a device that prints an image on a sheet or the like. The image forming device 100 is, for example, a multifunction peripheral. The plurality of image forming devices 100 are communicably connected to the network 400.

The communication device 200 is a device such as a wireless router (e.g., a Wi-Fi router). The communication device 200 connects another information device (for example, the user terminal 300) to the network 400. The user terminal 300 is an information processing device that transmits a job (e.g., a print job) to an image forming device 100. The image forming device 100 and the user terminal 300 are communicably connected to each other via the network 400. The network 400 is a communication path through which a plurality of devices can perform communication. The network 400 may be, for example, a wired local area network (LAN) or a wireless LAN. The network 400 may be implemented in another form.

Figure 2:
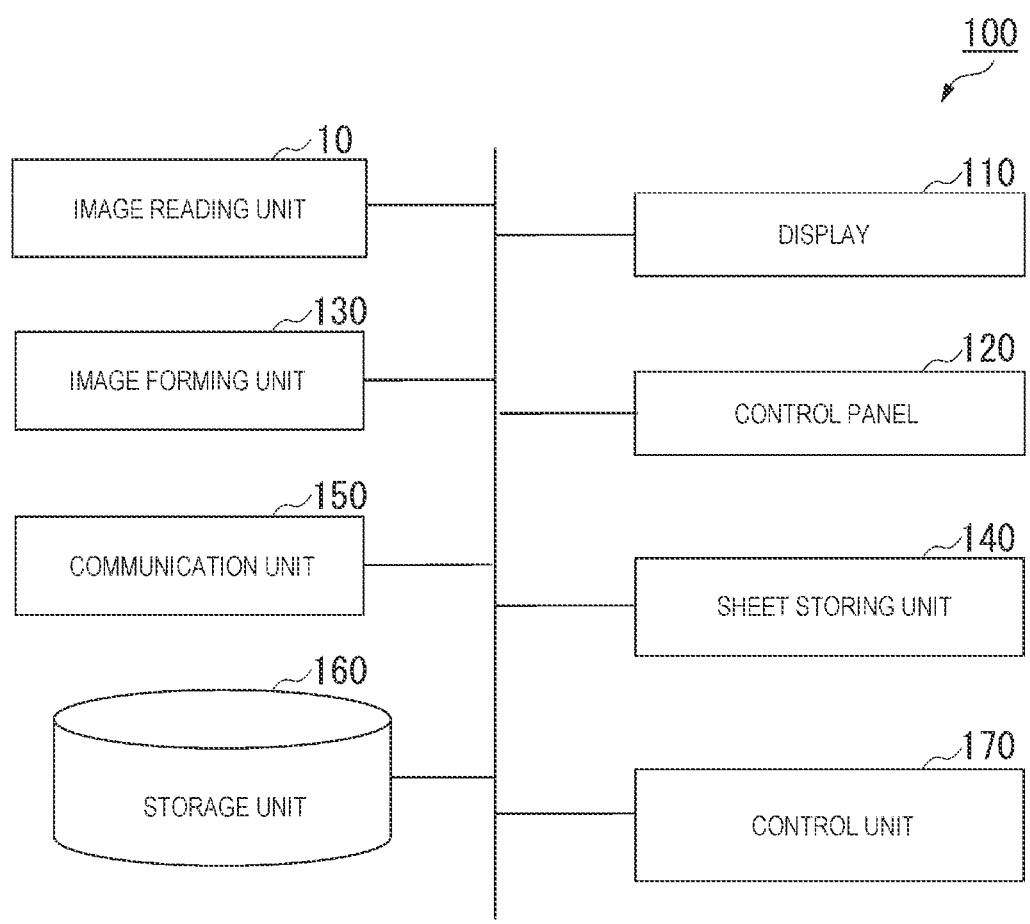
FIG. 2 is a hardware block diagram of an image forming device.

FIG. 2 is a hardware block diagram of an image forming device 100 according to an embodiment. The image forming device 100 will be described with reference to FIGS. 1 and 2. The image forming device 100 includes an image reading unit 10, a display 110, a control panel 120, an image forming unit 130, a sheet storing unit 140, a communication unit 150, a storage unit 160, and a control unit 170.

The image forming device 100 forms an image on a sheet using a developing agent such as toner or ink. The sheet may be any material as long as the image forming device 100 can form an image on a surface thereof.

The image reading unit 10 reads image information from a reading target based on brightness and darkness of reflected light or the like. The image reading unit 10 records the read image information. The recorded image information may be transmitted to another information processing device via the network 400. The recorded image information may be printed on the sheet by the image forming unit 130.

The display 110 is an image display device such as a liquid crystal display and an organic electroluminescence (EL) display. The display 110 displays various kinds of information for the image forming device 100.

The control panel 120 includes an input operation device such as a plurality of buttons. The control panel 120 receives an input operation from a user. For example, the control panel 120 may accept an input of numbers or characters. The control panel 120 outputs a signal corresponding to the operation performed by the user to the control unit 170. The display 110 and the control panel 120 may be implemented as an integrated touch panel.

The image forming unit 130 forms an image on a sheet based on the image information generated by the image reading unit 10 or image information received via a communication path. The image forming unit 130 includes, for example, a photoconductor drum, an exposure device, a developing device, a transfer device, and a fixing device.

The sheet storing unit 140 stores a sheet used for image formation by the image forming unit 130. The sheet storing unit 140 is provided with a conveyance roller. The conveyance roller conveys a sheet stored in the sheet storing unit 140 to a conveyance path leading to the image forming unit 130 for printing.

The communication unit 150 is implemented as a communication interface. The communication unit 150 communicates with other devices (for example, the communication device 200 or the user terminal 300) via the network 400.

The storage unit 160 is implemented as a storage device such as a magnetic hard disk device and a semiconductor storage device. The storage unit 160 stores data required for operation of the image forming device 100. The storage unit 160 may temporarily store data of an image formed in the image forming device 100.

The control unit 170 comprises a processor (such as a central processing unit (CPU)) and a memory. The control unit 170 reads out and executes a program stored in the storage unit 160. The control unit 170 controls operations of the sub-units provided in the image forming device 100. For example, when receiving an image formation request from the user terminal 300, the control unit 170 may control units of the image forming device 100 to form an image corresponding to the received image formation request on a sheet. For example, when receiving a state checking request from the user terminal 300, the control unit 170 generates information (a state checking result) indicating a state of the image forming device 100 and transmits the corresponding information to the user terminal 300.

Figure 3:
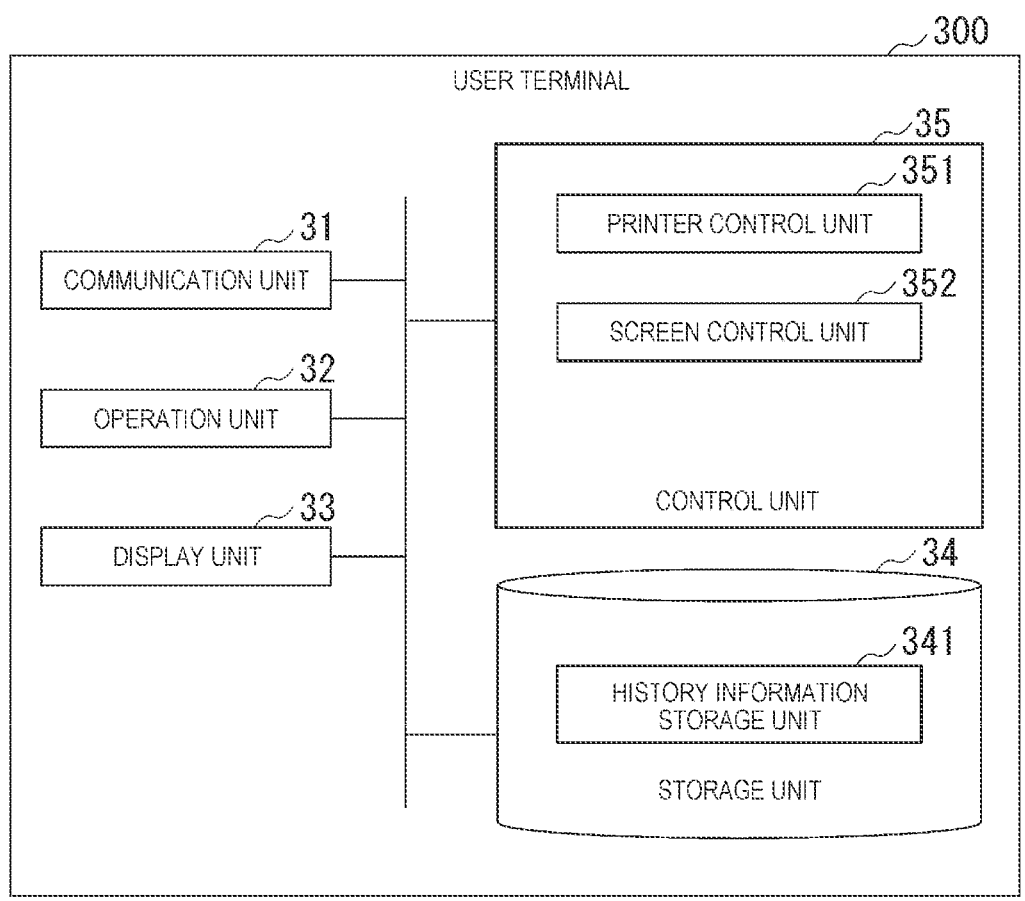
FIG. 3 is a hardware block diagram of a user terminal.

FIG. 3 is a hardware block diagram of the user terminal 300. The user terminal 300 may be a portable information processing device such as a smartphone, a tablet, or a portable game device. The user terminal 300 may also be a stationary information processing device such as a personal computer, a workstation, a stationary game device, and a television receiver. The user terminal 300 includes a communication unit 31, an input operation unit 32, a display unit 33, a storage unit 34, and a control unit 35.

The communication unit 31 is implemented as a communication interface. The communication unit 31 may be implemented using, for example, a communication interface that performs wireless communication. In this case, the communication unit 31 performs wireless communication with the communication device 200. The communication unit 31 communicates with each image forming device 100 via the communication device 200 and the network 400.

The input operation unit 32 is implemented as one or more existing input device such as a keyboard, a pointing device (a mouse, a tablet, or the like), a button, or a touch panel. The input operation unit 32 is operated by the user when the user inputs instructions into the user terminal 300. The input operation unit 32 may be an interface that connects an input device to the user terminal 300. In this case, the input operation unit 32 inputs, to the user terminal 300, an input signal generated in response to an input of the user using the input device. The input operation unit 32 may be implemented as a microphone and a voice recognition device. In this case, the input operation unit 32 performs voice recognition of words spoken by the user, and then inputs character string information or the like as a recognition result to the user terminal 300. In some examples, the input operation unit 32 may perform only the voice input, and the voice recognition may be executed by the control unit 35. In general, the input operation unit 32 may be implemented in any way as long as the instruction of the user can be input to the user terminal 300.

The display unit 33 displays information in a form that can be recognized by the user. The display unit 33 may be an image display device such as a liquid crystal display and an organic electroluminescence (EL) display. In some examples, the display unit 33 may be an interface that connects an image display device to the user terminal 300. In this case, the display unit 33 generates a video signal for displaying the image data and outputs the video signal to the image display device connected to the user terminal 300.

The storage unit 34 is implemented as a storage device such as a magnetic hard disk device and a semiconductor storage device. The storage unit 34 stores data required for operation of the user terminal 300. The storage unit 34 stores a program code of a predetermined application installed in the user terminal 300. The storage unit 34 stores, for example, identification information indicating the identification of the user terminal 300. Specific examples of such identification information include an IP address, a pre-assigned ID, and a terminal name used on the network 400. The storage unit 34 also functions as a history information storage unit 341.

The history information storage unit 341 stores information on previous image forming jobs executed for the user terminal 300 (hereinafter, referred to as "history information"). The history information may be, for example, information indicating the particular image forming device 100 used in a prior image forming job executed for the user terminal 300. The history information may include information indicating an option (print option) used in a previous image forming job.

In this context, an option refers to an additional function that may be used in image formation jobs. Specific examples of an option include additional functions such as a process of forming an image on both sides of a sheet ("double-sided image formation" or "double-sided printing)), forming an image in color ("color image formation" or "color printing"), a post-process using a staple (hereinafter referred to as "stapling"), and bookbinding. The history information storage unit 341 may discard older information satisfying a predetermined condition. For example, the history information storage unit 341 may store only information from the most recently executed image forming jobs up to a predetermined number of past jobs. For example, the history information storage unit 341 may store only information from the most recently used image forming devices 100 up to a predetermined number of image forming devices 100.

The control unit 35 is implemented using a processor, such as a CPU, and a memory (a main storage device). The control unit 35 functions when the processor executes a program. All or a part of the functions of the control unit 35 may be implemented using hardware such as an application specific integrated circuit (ASIC), a programmable logic device (PLD), and a field programmable gate array (FPGA). The above-mentioned program may be recorded on a computer-readable recording medium. The computer-readable recording medium refers to storage devices such as a portable medium, for example, a flexible disk, a magneto-optical disk, an ROM, a CD-ROM, and a semiconductor storage device (for example, a solid-state drive (SSD)), or a hard disk or a semiconductor storage device built in a computer system. The above-mentioned program may be downloaded or otherwise accessed via a telecommunication line.

The control unit 35 may execute, for example, an application installed in advance on the user terminal 300. A specific example of such an application includes an application provided to the user terminal 300 as a dedicated application of the image forming system 500. Another specific example of such an application includes a web browser application. The control unit 35 operates according to the program instructions of the application being executed. The control unit 35 operates as, for example, a printer control unit 351 and a screen control unit 352.

The printer control unit 351 transmits an image forming job to an image forming device 100 in response to an operation of the user. The printer control unit 351 records information on the transmitted image forming job in the history information storage unit 341. For example, the printer control unit 351 may record, in the history information storage unit 341, information indicating a transmission destination (the image forming device 100 selected for image formation) for the transmitted image forming job and information indicating the option(s) used for the transmitted image forming job.

The screen control unit 352 generates screen data to be displayed on the display unit 33 and displays the screen data on the display unit 33. For example, when the user performs an operation to start searching for an image forming device 100, the screen control unit 352 generates screen data of a device search screen and displays the screen data on the display unit 33. Hereinafter, a specific example of the screen data of the device search screen will be described.

Figure 4:
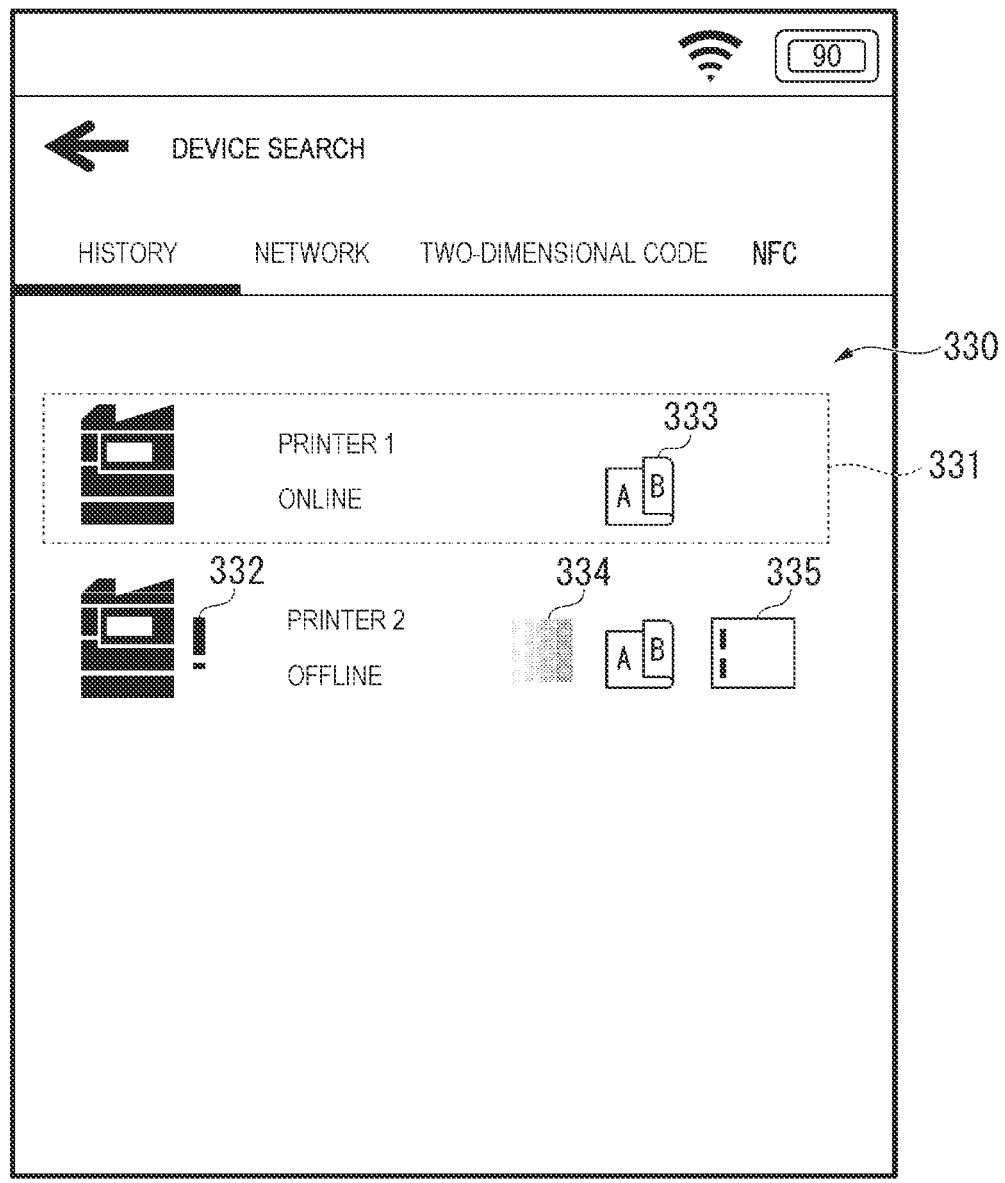
FIG. 4 is a diagram showing a device search screen example.

FIG. 4 is a diagram showing a display example of a device search screen. The device search screen includes a history display screen, a network display screen, a two-dimensional code display screen, and an NFC display screen. In the example in FIG. 4, the history display screen is displayed. On the history display screen, information about the image forming device(s) 100 used by the user of the user terminal 300 in the past is displayed.

On the network display screen, information about the image forming device(s) 100 that can communicate via the network 400 is displayed. On the network display screen, the screen control unit 352 of the user terminal 300 may search for the image forming devices 100 that can communicate via the network 400, and information obtained as a search result may be displayed. On the network display screen, information about any image forming device 100 registered in the storage unit 34 of the user terminal 300 may be displayed.

On the two-dimensional code display screen, a screen for reading a two-dimensional code prepared in advance for communication connection to an image forming device 100 via the network 400 can be displayed. Such a two-dimensional code may be stored in the image forming device 100 or may be distributed to the user as a document. For example, when the two-dimensional code display screen is displayed, an imaging device provided in the user terminal 300 may be used to image the two-dimensional code and a process of searching for a two-dimensional code in a captured image and decoding the two-dimensional code may be performed. When the two-dimensional code related to an image forming device 100 is read, information about the read image forming device 100 can be displayed on the two-dimensional code display screen.

When the NFC display screen is displayed, information for communication connection to an image forming device 100 via the network 400 can be exchanged using NFC (near-field communication). Information indicating the progress of an exchange of information for communication connection can be displayed on the NFC display screen. When the exchange using NFC is completed, information about the image forming device 100 for which the exchange was completed is displayed on the NFC display screen.

A specific example of the history display screen will be described with reference to FIG. 4. On the history display screen, an area (hereinafter, referred to as a "history display area") is displayed where a list of the image forming devices 100 used by the user of the user terminal 300 in the past is shown. In FIG. 4, the history display area 330 is depicted. In the history display area 330, an area for displaying information on a state of individual image forming devices 100 (hereinafter, referred to as a "state display area") is displayed. In FIG. 4, the state display area 331 is depicted.

In the state display area 331, an icon indicating the image forming device 100, an identifier of the image forming device 100, information indicating a state of the image forming device 100, and information indicating an option executable by the image forming device 100 are displayed. As a specific example of the identifier of the image forming device 100, a name given to the image forming device 100 is displayed in FIG. 4. "Printer 1" and "Printer 2" shown in FIG. 4 are specific examples of names given to the image forming devices 100. As a specific example of the identifier of the image forming device 100, a name given to the image forming device 100 is displayed in FIG. 4. "Printer 1" and "Printer 2" shown in FIG. 4 are specific examples of names given to the image forming devices 100.

The information indicating the state of the image forming device 100 indicates, for example, whether the image forming device 100 is in a usable state. An iconographic image 332 (icon) indicates that the image forming device 100 is not in a usable state. For example, if the image forming device 100 is not in a usable state, the information indicating the state of the image forming device 100 may indicate information on the cause. For example, when the image forming device 100 is offline, text "offline" may be displayed. For example, when an error (malfunction) occurs in the image forming device 100, the occurrence of the error may be indicated or the type of the error may be indicated. Examples of the type of the error include paper out, toner out, and jam.

The information indicating the state of the image forming device 100 indicates a result from making an inquiry to each image forming device 100 by the screen control unit 352 when the history display screen is displayed. That is, when displaying the history display screen, the screen control unit 352 inquires of each image forming device 100 displayed in the history display area 330 about its current state and checks the current state. Such checking may be performed by communication using a protocol such as WS Discovery and SNMP. The screen control unit 352 determines, based on the checking result, information indicating the state displayed in the state display area of each image forming device 100.

In the example in FIG. 4, three images are displayed as information indicating the options. An image 333 indicates double-sided image formation. The image forming device 100 in which the image 333 is displayed in the state display area 331 can execute a double-sided image formation. An image 334 indicates color image formation. The image forming device 100 in which the image 334 is displayed in the state display area 331 can execute a color image formation. An image 335 indicates stapling. The image forming device 100 in which the image 335 is displayed in the state display area 331 can execute a stapling.

In the history display screen, the user can select the image forming device 100 to be used for the current image formation job (print job) from the image forming devices 100 used by the user in the past. For example, the user can select an image forming device 100 by performing a selection operation (for example, tapping) on the state display area 331. The printer control unit 351 transmits an image forming job to the image forming device 100 selected by the user on the history display screen.

Figure 5:
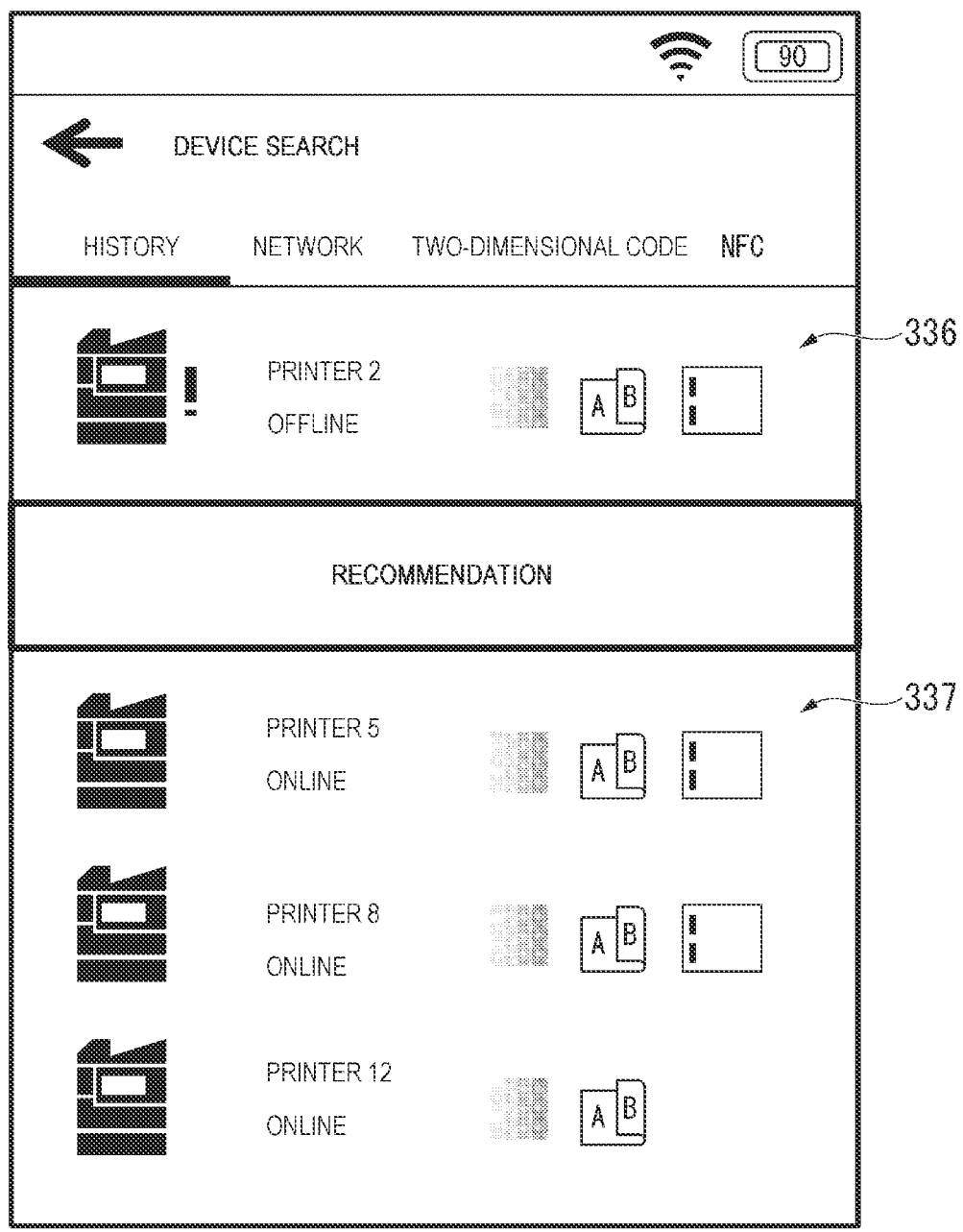
FIG. 5 is a diagram showing a candidate display screen example.

When an image forming device 100 that is unusable is selected on the history display screen, a candidate display screen is displayed on the display unit 33. FIG. 5 is a diagram showing a specific example of the candidate display screen. The candidate display screen is displayed as one of the history display screens. A reference display area 336 and a candidate display area 337 are displayed on the candidate display screen. The reference display area 336 displays information of the state display area 331 about the image forming device 100 that was selected by the user but is presently unusable. The candidate display area 337 displays information of the state display area 331 about the image forming device(s) 100 presently usable and that which satisfy the predetermined candidate condition(s).

The candidate condition is that all options (hereinafter referred to as "reference options") that are usable by the image forming device 100 (the image forming device 100 that is unusable at that time point but is selected by the user) displayed in the reference display area 336 are usable. In this case, all or only a part of the image forming devices 100 satisfying the candidate condition are displayed in the candidate display area 337.

The candidate condition may be that at least some of the options can be used. In this case, in the candidate display area 337, priorities are given to the image forming devices 100 satisfying the candidate condition, and some or all of the image forming devices 100 can be displayed in a descending order of priority. Regarding the priority, the greater the number of usable options among the reference options is, the higher the priority. In addition, in some examples, a weighting may be given to certain types of the reference options, and a higher priority may be given to the usable reference option having a higher weighting. The weighting for the type of options may be given a predetermined value in advance. The weighting by the type of options may be given based on, for example, the number of times or frequency of actual use of the option by the user in the past. In this case, as the number of times the user actually used the option in the past becomes larger and as the frequency is higher, a higher weight is given. In some examples, the type of the option(s) determining the candidate conditions may be set by the user. For example, if only two options of double-sided image formation and color image formation are set by the user, the two options are set as reference options, and the determination is made based on only these two options.

The screen control unit 352 searches for a usable image forming device 100 via the network 400. The screen control unit 352 selects, based on the candidate condition and the priority order for the searched image forming device 100, the image forming device(s) 100 to be displayed on the candidate display screen. The screen control unit 352 provides information on the selected image forming device 100 in the candidate display area 337 and generates screen data.

FIG. 6 is a sequence chart showing a specific example of a processing flow of the image forming system 500. First, the user operates the user terminal 300 to display a history display screen (ACT 101). In response, the screen control unit 352 reads the history information storage unit 341 and determines the image forming devices 100 to be displayed on the history display screen. The screen control unit 352 transmits a state checking request to each identified image forming device 100 (in the example in FIG. 6, the image forming device 1 and the image forming device 2) (ACT 102). Upon receiving the state checking request, each image forming device 100 generates a state checking result which is information indicating the state of itself and transmits the state checking result to the user terminal 300 (ACT 103).

After receiving the state checking result from each image forming device 100, the screen control unit 352 of the user terminal 300 generates screen data of a history display screen based on the received information. The screen control unit 352 displays the generated screen data of the history display screen (for example, the screen in FIG. 4) on the display unit 33 (ACT 104).

If the user selects a usable image forming device 100, the printer control unit 351 transmits a job to the selected image forming device 100. On the other hand, if the user selects an unusable image forming device 100 (ACT 105), the screen control unit 352 transmits the state checking request to the plurality of image forming devices 100 (ACT 106). At this time, the image forming devices 100 to which the state checking request is sent may be all the image forming devices 100 or may be the image forming devices 100 excluding any image forming device 100 that was already sent a state checking request in ACT 102. Furthermore, only those image forming devices 100 satisfying the candidate condition may be sent a state checking request in some examples. In such a case, the storage unit 34 may store information indicating available options for all the image forming devices 100. Upon receiving the state checking request, each image forming device 100 generates a state checking result which is information indicating a state of the respective image forming device 100 and transmits the state checking result to the user terminal 300 (ACT 107).

Upon receiving the state checking result from each image forming device 100, the screen control unit 352 of the user terminal 300 generates screen data for a candidate display screen based on the received information. The screen control unit 352 displays the generated screen data for the candidate display screen (for example, the screen in FIG. 5) on the display unit 33 (ACT 108).

If the user then selects a usable image forming device 100 from the candidate display screen, the printer control unit 351 transmits a job to the selected image forming device 100 (ACT 110).

According to the image forming system 500 implemented as described above, the operation burden on the user when selecting the desired image forming device 100 at the user terminal 300 can be reduced.

The image forming devices 100 actually used by the user in the past is displayed on the history display screen. As one of the pieces of information about each image forming device 100, information indicating whether the image forming device 100 is presently in a usable state is also displayed. Therefore, the user can easily select an image forming device 100 that can be used at the current time point from among those image forming devices 100 previously used by the user.

If an image forming device 100 that is unusable at the current time point is selected on the history display screen, the candidate display screen is displayed. On the candidate display screen, the image forming devices 100, for which all or a part of the options (reference options) corresponding to the selected image forming device 100 are usable are displayed according to a priority order. Therefore, even if the user cannot use the desired image forming device 100, the user can easily search for another image forming device 100 having the same functions as the initially selected image forming device 100.

Modifications

A part of the configuration of the user terminal 300 may be implemented in another information processing device (for example, a cloud system) communicably connected via a network such as the Internet. For example, the history information storage unit 341 may be implemented in another information processing device such a cloud system or the like. In this case, when referring to the information in the history information storage unit 341, the control unit 35 refers to the information by accessing another information processing device via the network.

While certain embodiments are described, these embodiments are presented as examples and are not intended to limit the scope of the disclosure. These embodiments can be implemented in various other forms, and various omissions, substitutions, and modifications can be made without departing from the gist of the disclosure. The embodiments and variations thereof are included within the scope of the claims and equivalents thereof as well as within the scope and gist of the disclosure.

What is claimed is:

1. An information processing method for a user terminal connectable to a plurality of image forming devices, the method comprising:
   acquiring use information from a local storage device of a user terminal, the use information regarding past use of image forming devices in a plurality of image forming devices;
   identifying, based on the use information, the image forming devices in the plurality of image forming devices that have been used in the past by a user of the user terminal;
   transmitting a status request to the image forming devices in the plurality of image forming devices used in the past;
   generating screen data for a history display screen based on the use information regarding the past use of the image forming devices, the history display screen showing image forming devices in the plurality of image forming devices identified as used in the past; and
   causing a display device to display the history display screen with those previously used image forming devices currently in a usable status, based on a returned status request response, being shown in one mode and those previously used image forming devices currently in an unusable status, based on a returned status request, being shown in another mode.

2. The information processing method according to claim 1, further comprising:
   when an image forming device currently in an unusable status is selected for use via the history display screen, generating screen data for a candidate display screen, the candidate display screen including at least one image forming device in the plurality of image forming devices meeting at least one candidate selection condition.

3. The information processing method according to claim 2, wherein the candidate selection condition is that the candidate image forming device shares at least one attribute of the selected image forming device currently in the unusable state.

4. The information processing method according to claim 3, wherein the at least one attribute is a color printing capability.

5. The information processing method according to claim 3, wherein the at least one attribute is a double-sided printing capability.

6. The information processing method according to claim 3, wherein the at least one attribute is a stapling capability.

7. The information processing method according to claim 2, wherein, when multiple candidate selection conditions are met by more than one image forming device in the plurality of image forming devices, the candidate image forming devices are displayed in a list in a descending order of priority set for the candidate selection conditions.

8. The information processing method according to claim 1, wherein the status requests are transmitted only to the image forming devices in the plurality of image forming devices that have been used in the past from the user terminal.

9. The information processing method according to claim 8, further comprising:
   transmitting a status request to the image forming devices in the plurality of image forming devices that have not been used in the past from the user terminal after an image forming device currently in an unusable status is selected for use via the history display screen.

10. The information processing method according to claim 9, further comprising:
    generating screen data for a candidate display screen, the candidate display screen including at least one image forming device in the plurality of image forming devices meeting at least one candidate selection condition.

11. An information processing method, comprising:
    acquiring information about image forming devices used in the past by a user of a user terminal;
    identifying, based on the acquired information, an image forming device used by the user of the user terminal in the past;
    generating screen data of a history display screen including the information about the identified image forming device used in the past; and
    causing a display device to display information about currently usable image forming devices and information about a currently unusable image forming devices with different display characteristics.

12. The information processing method according to claim 11, further comprising:
    causing the display device to display information about an image forming device that is currently usable and that satisfies a predetermined candidate condition after the currently unusable image forming device is selected by the user on the history display screen.

13. The information processing method according to claim 12, wherein the predetermined candidate condition is that at least one additional function otherwise available with the unusable image forming device selected by the user is available with the currently usable image forming device.

14. The information processing method according to claim 13, wherein the predetermined candidate condition is that the candidate image forming device shares at least one attribute of the selected image forming device currently in the unusable state.

15. The information processing method according to claim 14, wherein the at least one attribute is a color printing capability.

16. The information processing method according to claim 14, wherein the at least one attribute is a double-sided printing capability.

17. The information processing method according to claim 14, wherein the at least one attribute is a stapling capability.

18. The information processing method according to claim 12, wherein image forming devices satisfying the predetermined candidate condition are displayed in a descending order of priority based on one or more predetermined candidate conditions.

19. A non-transitory, computer-readable medium storing program instructions which when executed by a processor of a user terminal causes the user terminal to perform a method comprising:
- acquiring use information from a local storage device of a user terminal, the use information regarding past use of image forming devices in a plurality of image forming devices;
- identifying, based on the use information, the image forming devices in the plurality of image forming devices that have been used in the past by a user of the user terminal;
- transmitting a status request to the image forming devices in the plurality of image forming devices used in the past;
- generating screen data for a history display screen based on the use information regarding the past use of the image forming devices, the history display screen showing only image forming devices in the plurality of image forming devices identified as used in the past; and
- causing a display device to display the history display screen with those previously used image forming devices currently in a usable status based on a returned status request response being shown in one mode and those previously used image forming devices currently in an unusable status based on a returned status request being shown in another mode.

20. The medium according to claim 19, wherein the method further comprises:
- when an image forming device currently in an unusable status is selected for use via the history display screen, generating screen data for a candidate display screen, the candidate display screen including at least one image forming device in the plurality of image forming devices meeting at least one candidate selection condition.

* * * * *